US005352367A

United States Patent [19]

Ochiai et al.

[11] Patent Number: 5,352,367

[45] Date of Patent: Oct. 4, 1994

[54] PROCESS FOR THE SEPARATION OF RADIOACTIVE IODINE COMPOUNDS BY PRECIPITATION

[75] Inventors: Ken-ichi Ochiai, Mito; Yoshiro Fuseya, Yokohama, both of Japan

[73] Assignee: Doryokuro Kakunenryo Kaihatsu Jigyodan, Tokyo, Japan

[21] Appl. No.: 970,847

[22] Filed: Nov. 3, 1992

[30] Foreign Application Priority Data

Nov. 5, 1991 [JP] Japan .............................. 3-317419

[51] Int. Cl.$^5$ .............................. C02F 1/70; C02F 1/58

[52] U.S. Cl. .............................. 210/719; 210/911; 423/249

[58] Field of Search .............................. 423/2, 249, 42, 46, 423/491; 210/719, 911; 252/631

[56] References Cited

U.S. PATENT DOCUMENTS

| | | | |
|---|---|---|---|
| 3,429,655 | 2/1969 | Case | 423/249 |
| 3,792,154 | 2/1974 | Cathers et al. | 252/631 |
| 3,914,388 | 10/1975 | Cathers et al. | 423/249 |
| 4,116,863 | 9/1978 | Berton et al. | 423/2 |
| 4,229,317 | 10/1980 | Babad et al. | 423/249 |
| 4,275,045 | 6/1981 | Anav et al. | 423/249 |
| 4,362,660 | 12/1982 | Partridge et al. | 252/631 |
| 4,461,711 | 7/1984 | Behrens | 252/631 |

OTHER PUBLICATIONS

United States Statutory Invention Registration, Reg. No. H800, Beahm et al., Jul. 3, 1990.

*Primary Examiner*—Neil McCarthy
*Attorney, Agent, or Firm*—Wenderoth, Lind & Ponack

[57] ABSTRACT

A process for the separation of radioactive iodine compounds by precipitation is provided. This process comprises adding 0.1 to 3 parts by weight of a reducing agent and an effective amount of silver nitrate to 100 parts by weight of a liquid waste containing radioactive iodine compounds while keeping the liquid waste at a temperature ranging from 20° to 80°C., and stirring the obtained mixture for 0.5 to 72 hours to precipitate the radioactive iodine compounds. Silver nitrate is preferably used in a molar concentration which is 1 to 4 times that of radioactive iodine molecules contained in the liquid waste. By this process, iodates which could not be precipitated by conventional methods can be effectively precipitated and separated to thereby reduce the amount of radioactive iodine discharged to the environment.

2 Claims, 2 Drawing Sheets

PROCESS FOR THE SEPARATION OF RADIOACTIVE IODINE COMPOUNDS BY PRECIPITATION

BACKGROUND OF THE INVENTION

The present invention relates to a process for separating radioactive iodine compounds contained in a liquid waste by precipitation. More particularly, it relates to a process wherein iodates contained in a liquid waste are reduced and then precipitated with silver nitrate.

The process of the present invention is applicable to the disposal of liquid waste discharged from, e.g., nuclear power plants, reprocessing plants and various nuclear energy research facilities.

A liquid waste discharged from nuclear facilities contains radioactive iodine compounds (mainly comprising molecular iodine, iodates and iodides). Known methods for the disposal of such radioactive iodine compounds in the liquid waste include (1) solidification, (2) ion exchange resin method, and (3) coagulating sedimentation method.

The solidification method (1) is a method of confining the iodine compounds in a solidified material such as asphalt. The iodine compounds flowing into an off-gas system are adsorbed on a silver/zeolite filter. According to the method (1), molecular iodine ($I_2$) and/or organoiodine compounds tend to be released by the action of heat generated during solidification and iodide ion ($I^-$) may be oxidized into volatile molecular iodine ($I_2$). Further, the silver/zeolite filter is poorly effective in capturing the iodine compounds in some cases. The ion exchange resin method (2) is a method of passing the liquid waste through an ion exchange resin to adsorb the radioactive iodine compounds on the resin, thereby separating the compounds. However, the method (2) has a problem that the separation of the iodates is difficult. The coagulating sedimentation method (3) is a method of adding silver nitrate to the liquid waste to precipitate the iodine compounds. The method (3) also has a problem that the precipitation and separation of the iodates is difficult.

The main chemical forms of radioactive iodine contained in the above-described liquid waste are iodate ion ($IO_3^-$) and iodide ion ($I^-$). The iodate ion has a possibility that it cannot be sufficiently separated by the ion exchange resin method or the coagulating sedimentation method according to the prior art but will be discharged into the sea. Alternatively, the residual iodate ion may be converted into volatile iodine in the subsequent solidification step to be discharged into the atmosphere. On the other hand, the iodide ion is in danger of being evaporated during the treatment of the liquid waste or being converted into a volatile chemical form by the action of heat or air and discharged into the atmosphere.

SUMMARY OF THE INVENTION

An object of the present invention is to solve the above-described prior art problems and to provide a process wherein radioactive iodine compounds, including iodates which have been difficult to separate and remove according to the prior art methods, can be efficiently precipitated and separated from a liquid waste.

According to the present invention, there is provided a process for the separation of radioactive iodine compounds by precipitation which comprises adding 0.1 to 3 parts by weight of a reducing agent and an effective amount of silver nitrate to 100 parts by weight of a liquid waste containing radioactive iodine compounds while keeping the liquid waste at a temperature ranging from 20° to 8020 C., and stirring the obtained mixture for 0.5 to 72 hours to precipitate the radioactive iodine compounds.

The term "reducing agent" used in this specification refers to a substance having an oxidation potential (standard oxidation potential) larger than the maximum oxidation potential among those of the iodine chemical species exhibited in the redox reaction thereof.

PREFERRED EMBODIMENTS OF THE INVENTION

Figure 1:
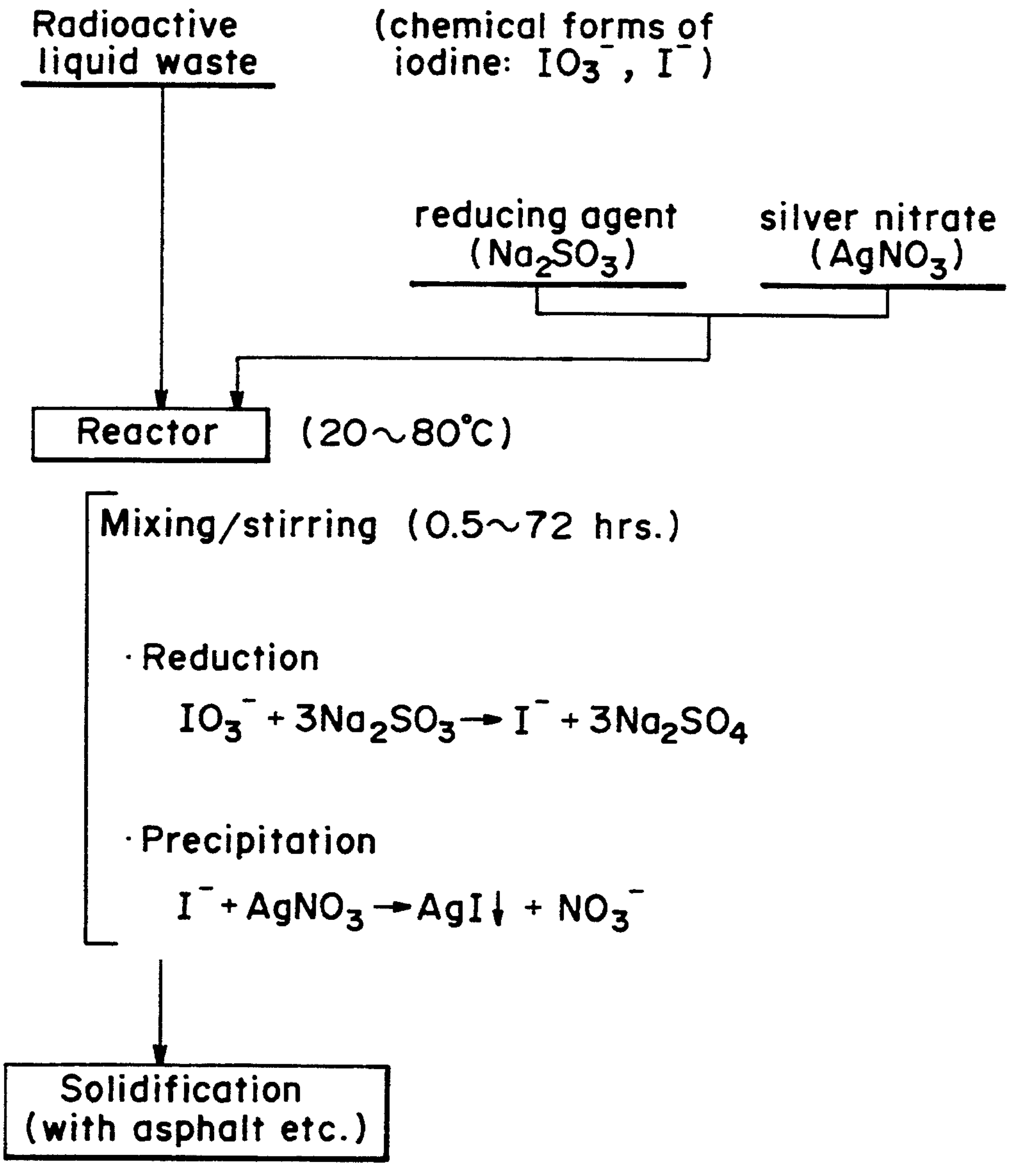
FIG. 1 is a flow chart illustrating an example of the process of the present invention.

Referring to FIG. 1 showing an example of the process of the present invention, a radioactive liquid waste is first introduced into a reactor. The liquid waste is kept at 20° to 80° C. in order to efficiently conduct the reaction which will be described below. The main chemical forms of radioactive iodine contained in the liquid waste are estimated to be iodate ion ($IO_3^-$) and iodide ion ($I^-$). A reducing agent (such as sodium sulfite, $Na_2SO_3$) and silver nitrate ($AgNO_3$) are added to the liquid waste. Although the addition of a larger amount of a reducing agent is more effective, the amount of the reducing agent to be added should be 0.1 to 3 parts by weight per 100 parts by weight of the liquid waste so as not to enhance the salt concentration in the reaction system. It is preferable to use silver nitrate in a molar concentration which is about 1 to 4 times that of radioactive iodine molecules contained in the liquid waste.

In the reactor, iodate ion is reduced into iodide ion according to the following formula:

$$IO_3^- + 3Na_2SO_3 \rightarrow I^- + 3Na_2SO_4.$$

Then, the resulting iodide ion is reacted with silver nitrate to precipitate silver iodide (AgI) according to the following formula:

$$I^- + AgNO_3 \rightarrow AgI\downarrow + NO_3^-.$$

These reactions are completed by stirring the reaction system for 0.5 to 72 hours.

In the process of the present invention, iodate ion ($IO_3^-$) which has been difficult to precipitate according to the coagulating sedimentation method of the prior art is reduced into iodide ion ($I^-$) by the action of the reducing agent added, and the resulting iodide ion is further reacted with silver nitrate to precipitate silver iodide (AgI). Thus, most of the radioactive iodine compounds contained in radioactive liquid waste discharged from a nuclear facility can be separated from the liquid waste. In this connection, in a case wherein the iodate ion ($IO_3^-$) is not reduced but remains as such, silver nitrate ($AgNO_3$) reacts with sodium carbonate ($Na_2CO_3$) contained in the liquid waste to form silver carbonate ($Ag_2CO_3$) selectively, when silver nitrate is added. As a result, no salt-forming reaction occurs between the iodate ion ($IO_3^-$) and silver nitrate.

EXAMPLE

Figure 2:
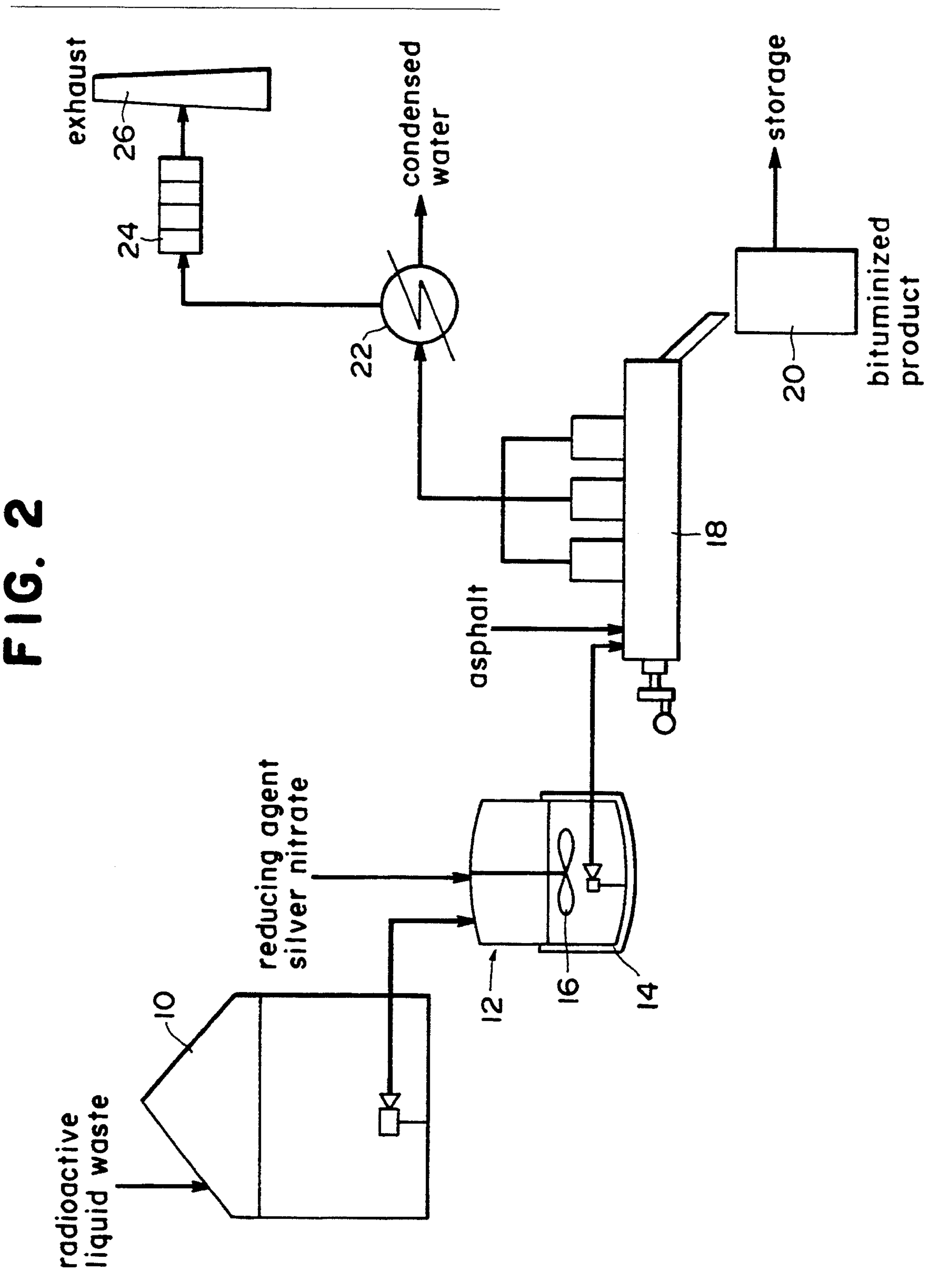
FIG. 2 is an illustration of an example of the construction of equipment used in applying the process of the present invention to the bituminization of radioactive liquid waste.

In FIG. 2, there is illustrated an example of the construction of equipment to be used in applying the process of the present invention to the bituminization of radioactive liquid waste. A liquid waste discharged from a nuclear facility is first fed into a storage tank 10. The liquid waste is then introduced into a reactor 12 from the tank 10. The reactor 12 is provided with a heating/lagging mechanism 14 for maintaining the liquid waste at a suitable temperature within a range of 20° to 80° C., and a stirring mechanism 16 for mixing and stirring the liquid waste therein. A reducing agent and silver nitrate are added to the reactor 12 each in an effective amount. The liquid waste treated in the reactor 12 and asphalt are transferred to an extruder 18 and heat treated therein. The bituminized product thus prepared is packed in a drum 20 and stored. The liquid waste evaporated during the bituminization is transferred to a condensor 22 and condesed. An off-gas from the condensor is passed through a silver/zeolite filter 24 and discharged through an exhaust pipe 26. In this equipment, the process of the present invention is carried out in the reactor 12.

The precipitation treatment of a low-level radioactive liquid waste (having a pH of 8.0) discharged from a reprocessing plant will now be described below. The low-level radioactive waste tested mainly comprised water, sodium nitrate ($NANO_3$), sodium carbonate ($Na_2CO_3$) and disodium hydrogenphosphate ($Na_2HPO_4$) at a ratio of 100:35:6:6 and contained 0.65 ppm of sodium iodide (NaI) and 0.74 ppm of sodium iodate ($NaIO_3$). The precipitation treatment of the present invention and that of the prior art were each applied to 1000 g of the above-described liquid waste kept at 50° C. The treatment of the present invention was carried out by adding 5 g of sodium sulfite ($Na_2SO_3$) as a reducing agent and 0.004 g of silver nitrate ($AgNO_3$) as a precipitant to the liquid waste and stirring the resulting mixture for 2 hours, while that of the prior art was carried out by adding only 0.004 g of silver nitrate ($AgNO_3$) to the liquid waste and stirring the resulting mixture for 2 hours.

The iodide and iodate ion concentrations in the liquid waste thus treated were determined by anion exchange chromatography. The results are given in Table 1.

TABLE 1

| | NaI concn. (ppm) | $NaIO_3$ concn. (ppm) |
|---|---|---|
| Initial low-level radioactive liquid waste | 0.65 | 0.74 |
| Invention method | 0 | 0 |
| Prior Art method | 0 | 0.74 |

As is apparent from this Table, the NaI and $NaIO_3$ concentrations in the liquid waste treated according to the present invention are both zero, which means that both the iodide and iodate ions are precipitated by the process of the present invention (characterized by adding $Na_2SO_3$ and $AgNO_3$), while the liquid waste treated according to the prior art still contains $NaIO_3$, which means that $NaIO_3$cannot be precipitated at all by the process of the prior art (characterized by adding only $AgNO_3$), though NaI can be precipitated.

Although sodium sulfite was used in the above Example as a reducing agent, the reducing agent usable in the present invention is not limited thereto. As described above, the reducing agent to be used in the present invention may be a substance having an oxidation potential larger than those of the iodine compounds and there are many substances satisfactory in this respect. The reducing agent usable in the present invention varies depending upon whether the liquid waste to be treated is acidic or alkaline. In practice, it is preferable to use a reducing agent which is applicable to both of acidic and alkaline liquid wastes, is hardly affected by the composition of the liquid waste to be treated and has a high reducing power. A typical example of the reducing agent satisfying these requirements is sodium sulfite as used in the above Example. Also, sodium hydrogensulfite has been experimentally confirmed to be useful as the reducing agent.

As is understood from the foregoing, according to the present invention wherein a reducing agent and silver nitrate are added each in an effective amount to liquid waste containing radioactive iodine compounds and the resulting mixture is stirred, the iodates which could not be precipitated by the process of the prior art can be precipitated and thus the amount of radioactive iodine discharged to the environment can be remarkably reduced.

What is claimed is:

1. A process for the separation of radioactive iodine compounds by precipitation, which comprises adding 0.1 to 3 parts by weight of a reducing agent selected from the group consisting of sodium sulfite and sodium hydrogensulfite and an effective amount of silver nitrate to 100 parts by weight of a liquid waste containing radioactive iodine compounds in the form of iodides and iodates while keeping the liquid waste at a temperature ranging from 20° to 80° C., and stirring the obtained mixture for 0.5 to 72 hours to reduce the iodates to iodides by the action of the reducing agent and to react the iodides with the silver nitrate to precipitate the iodides in the form of silver iodide.

2. The process according to claim 1, wherein the silver nitrate is added in a molar concentration which is 1 to 4 times that of radioactive iodine molecules contained in the liquid waste.

* * * * *